United States Patent [19]

Kitamura et al.

[11] 4,402,893
[45] Sep. 6, 1983

[54] METHOD FOR THE PREPARATION OF A CELLULAR FOAMED BODY OF A VINYL CHLORIDE-BASED RESIN

[75] Inventors: Hajime Kitamura, Ichihara; Kiyoshi Imada, Omiya; Yoshitugu Eguchi, Ibaraki, all of Japan

[73] Assignee: Shin-Etsu Chemical Co., Ltd., Tokyo, Japan

[21] Appl. No.: 144,988

[22] Filed: Apr. 30, 1980

[30] Foreign Application Priority Data

May 11, 1979 [JP] Japan .................................. 54-57917
May 16, 1979 [JP] Japan .................................. 54-59924

[51] Int. Cl.$^3$ .......................................... B29D 27/00
[52] U.S. Cl. .............................. 264/53; 264/DIG. 5; 264/DIG. 13
[58] Field of Search ............... 264/51, 53, 54, DIG. 5, 264/DIG. 13

[56] References Cited

U.S. PATENT DOCUMENTS

| | | | |
|---|---|---|---|
| 3,562,367 | 2/1971 | Shinohara et al. | 264/54 X |
| 3,814,779 | 6/1974 | Wiley | 264/53 |
| 3,822,331 | 7/1974 | Cogliano | 264/54 X |
| 3,979,347 | 9/1976 | Brotz et al. | 264/211 X |
| 3,983,296 | 9/1976 | Purvis et al. | 264/211 X |

OTHER PUBLICATIONS

Celanese Bulletin GIC: "Standard Tests on Plastics", 7th Edition, Newark, N.J., Celanese Plastics Co., Apr. 1974, pp. 1, 3, 5, 11, 12, 13, 24, 25.
Bernhardt, Ernest C., Edt., "Processing of Thermoplastic Materials," New York, Reinhold, ©1959, pp. 154-159, 163, 164.
McKelvey, James M., "Polymer Processing", New York, John Wiley and Sons, ©1962, pp. 277-278.
Whittington's Dictionary of Plastics", by Lloyd R. Whittington, Stamford, Conn., Technomic, ©1968, pp. 59, 60, 107, 114, 115, 116, 117, 181.
Developments in PVC Tech., p. 46.
JIS Standard, pp. 2, 7-9.
ASTM Standard, D/043, pp. 430-441.

*Primary Examiner*—Philip E. Anderson
*Attorney, Agent, or Firm*—Toren, McGeady and Stanger

[57] ABSTRACT

The invention provides a novel and improved method for the preparation of a cellular foamed body of a vinyl chloride-based resin having a very fine and uniform cellular structure with high productivity in a continuous process. According to the inventive method, a vinyl chloride-based resin is admixed with a nucleating agent and a foam conditioning resin which is a specified acrylic resin or a styrene-based resin into a resin composition and the resin composition is first heated under pressure to be converted into an at least partly gelled mass, into which a volatilizable foaming agent which is an organic solvent having a boiling point not exceeding 90° C. is injected under pressure so as that the resin composition is uniformly impregnated with the foaming agent. The foaming agent-impregnated and completely gelled resin composition is then brought under a reduced pressure to be expanded into foams with simultaneous cooling.

The above process is most conveniently practiced by use of an extruder machine in which the volatilizable foaming agent is continuously injected into the cylinder where the heated and gelled resin composition is running.

6 Claims, 2 Drawing Figures

$C_1$ RESIN SUPPLY SECTION
$C_2$ COMPRESSION SECTION
$C_3$ MEASURING SECTION
$C_4$ PRESSURE REDUCTION SECTION
$C_5$ MIXING SECTION
H HEAD
D DIE

METHOD FOR THE PREPARATION OF A CELLULAR FOAMED BODY OF A VINYL CHLORIDE-BASED RESIN

BACKGROUND OF THE INVENTION

The present invention relates to a method for the preparation of a cellular foamed body of a vinyl chloride-based resin.

In the prior art, cellular foamed bodies of vinyl chloride-based resins are prepared in several different ways. Some of the methods are as follows.

(1) The vinyl chloride-based resin is admixed with a so-called decomposable foaming agent which is a compound capable of producing gaseous decomposition products by heating and the blend is shaped with heating to effect foaming by use of an extruder machine or an injection machine.

(2) A paste-like plastisol is prepared by blending a vinyl chloride-based resin and a plasticizer and the plastisol is converted into foams by mechanical entrainment of air or, alternatively, the plastisol is admixed with a decomposable foaming agent followed by subsequent heating to effect simultaneous foaming and gelation into a desired foamed body.

(3) A blend of a vinyl chloride-based resin with a decomposable foaming agent is shaped by rolling or other suitable means at a temperature below the decomposition temperature of the foaming agent and the thus shaped body is heated at a temperature-higher than the decomposition temperature of the foaming agnet to effect expansion into a foamed body.

(4) A metal mold is filled with a mixture of a vinyl chloride-based resin and a decomposable foaming agent with optional admixture of a volatilizable foaming agent, a resin-swelling organic solvent and a softening agent and the mixture heated under pressure in the metal mold to be molten and gelled is taken out of the metal mold after cooling. The thus shaped body taken out of the metal mold is then heated to effect expansion into a foamed body.

The above described methods, however, have their respective drawbacks or disadvantages. For example, a rigid or semi-rigid foamed body of high expansion cannot be obtained by the above described first to the third methods. The fourth method is necessarily carried out batch-wise taking a long time for obtaining a foamed body with the complicated steps of the process resulting in increase of the production cost of the finally obtained products of the foamed bodies.

SUMMARY OF THE INVENTION

Thus, an object of the present invention is to provide a novel and improved method for the continuous and convenient preparation of a cellular foamed body of a vinyl chloride-based resin free from the above described drawbacks and disadvantages in the prior art methods and the inventive method is basically applicable to the process of extrusion-expansion.

The method of the present invention comprises heating a composition composed of 100 parts by weight of a vinyl chloride-based resin, from 0.01 to 20 parts by weight of a nucleating agent and from 0.3 to 30 parts by weight of a foam-conditioning resin, which is selected from the group consisting of acrylic resins and styrene-based resins, at a temperature between 60° and 250° C. under a superatmospheric pressure so as that the composition is converted into an at least partly gelled mass, pressurizing a volatilizable foaming agent which is a specified organic solvent having a boiling point of 90° C. or below into the thus at least partly gelled mass under the pressure to become impregnated therein followed by complete gelation of the mass and releasing the pressure to effect expansion of the gelled mass impregnated with the volatilizable foaming agent into a cellular foamed body with simultaneous cooling.

Typically, the above described steps of the inventive method are conveniently carried out in an extruder machine conventionally used in shaping of a thermoplastic resin. Foamed bodies of high expansion having a fine and uniform cell structure can be prepared easily and continuously with remarkably low production costs.

DETAILED DESCRIPTION OF THE PREFERRED EMBODIMENTS

Figure 1:
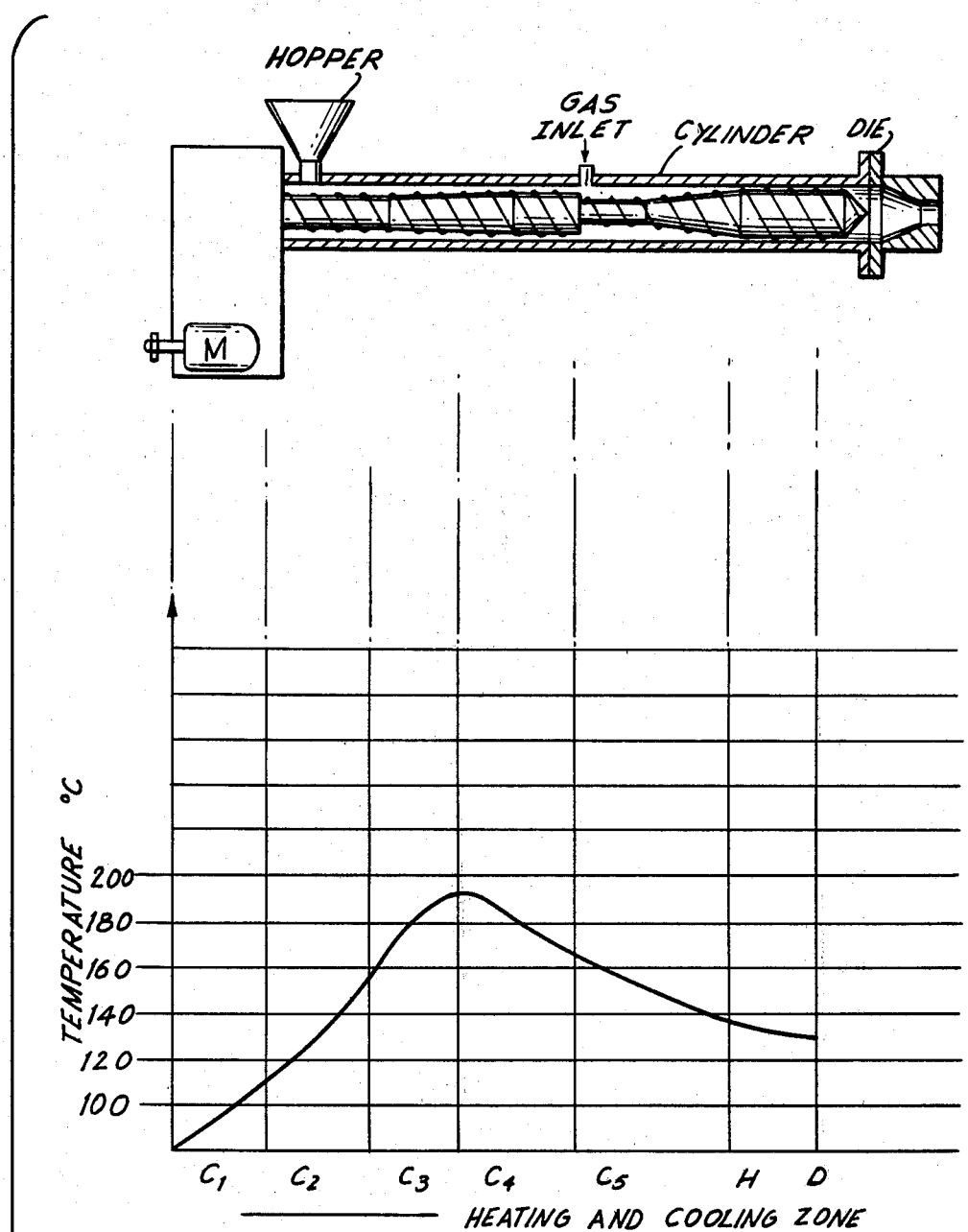
FIG. 1 is a cross-sectional diagram of a single screw extruder for use in the present process and a corresponding temperature distribution graph for the single screw.

The principal ingredient of the resin composition used in the inventive method is a vinyl chloride-based resin. The resin is not limited to homopolymeric polyvinyl chloride resins but any kinds of copolymers, graft copolymers and polymer blends are used equally in so far as the main component thereof, say, 50% by weight or more, is the vinyl chloride constituent. Monomers copolymerizable with vinyl chloride to give a copolymer are exemplified by vinyl esters such as vinyl acetate, vinylidene halides such as vinylidene chloride, acrylic acid and esters thereof, methacrylic acid and esters thereof, acrylonitrile, methacrylonitrile, maleic acid and esters and anhydride thereof, fumaric acid and esters thereof, olefins such as ethylene and propylene, vinyl ethers and the like. Vinyl chloride can be copolymerized with one or more of these comonomers.

Resins to be blended with a polyvinyl chloride resin to give a polymer blend should have a good compatibility with the polyvinyl chloride resins and are exemplified by polyvinylidene chloride, copolymers of ethylene and vinyl acetate, ABS resins, MBS resins, and chlorinated polyethylenes as well as synthetic rubbers such as NBR and SBR.

Among the copolymers of vinyl chloride with the above named comonomers, particularly preferred resins are the copolymers of vinyl chloride and vinyl acetate since these resins have good gelation behavior in the fabrication and the melt viscosity of the resin can be adjusted with ease at a suitable value so that a foamed body of high expansion having a fine and uniform cellular structure can readily be obtained with the resin.

The nucleating agent as the second component in the resin composition used in the inventive method serves to give nuclei for the incipient gas cells throughout the gelled mass of the resin composition. The requirement for the nucleating agent is that it can be distributed uniformly and finely in the gelled mass of the resin composition in the form of fine solid particles or in the form of incipient bubbles of a gas which are not dissolved away in the matrix phase of the gelled resin composition.

Various kinds of materials can satisfy the above requirement and used as the nucleating agent in the inventive method. A class of materials suitable as the nucleating agent is a finely divided solid particulate material typically belonging to the class of so-called inorganic fillers though not limited thereto. Several of the examples of such inorganic fillers are calcium carbonate, talc, barium sulfate, fumed silica, titanium dioxide, clay, aluminum oxide, bentonite, diatomaceous earth and the like.

The second class of the materials suitable as the nucleating agent is a compound capable of producing gaseous products on heating. Accordingly, the compounds of this class are selected from the so-called decomposable foaming agents conventionally used in the manufacture of cellular foamed plastic materials. The nucleating agent of this class may be either an inorganic or an organic decomposable foaming agent. The inorganic decomposable foaming agent is typically sodium hydrogencarbonate or potassium hydrogencarbonate. Even carbonates of sodium or potassium can be used as the nucleating agent when combined with a suitable acid compound such as citric acid, tartaric acid, oxalic acid and the like as well as boric acid.

Suitable organic decomposable foaming agents as the nucleating agent are exemplified, for example, by azo compounds such as azodicarbonamide, azobisisobutyronitrile, diazoaminobenzene, diethylazo dicarboxylate, diisopropylazo dicarboxylate and the like, foaming agents belonging to nitroso compounds such as N,N'-dinitroso pentamethylenetetramine, N,N'-dimethyl-N,N'-dinitroso terephthalamide and the like and foaming agents belonging to sulfonylhydrazide compounds such as benzene sulfonylhydrazide, toluene sulfonylhydrazide, 4,4'-oxybis (benzene sulfonylhydrazide), 3,3'-disulfonehydrazide phenylsulfone, toluene disulfonylhydrazone, thio-bis(benzene sulfonylhydrazide), toluene sulfonylazide, toluene sulfonyl semicarbazide, and the like.

The nucleating agent is, in the case where it is a powdery material, desirably a finely divided powder having an average particle diameter not exceeding 30 $\mu$m or, preferably, not exceeding 10 $\mu$m. This is because a nucleating agent having a particle diameter coarser than 30 $\mu$m cannot give a sufficient flowability to the resin composition under shaping leading to inferior surface gloss and appearance of striation along with decreased uniformity of the cellular foam structure. When the nucleating agent is a compound of the decomposable foaming agent, it has desirably a decomposition temperature lower than the temperature of shaping of the vinyl chloride-based resin in the resin composition.

The amount of the nucleating agent in the resin composition should be at least 0.01 part by weight per 100 parts by weight of the vinyl chloride-based resin. This is naturally because smaller amounts of the nucleating agent than above cannot give a foamed body with fine and uniform cellular structure. The upper limit of the amount of the foaming agent differs widely depending on the type of the nucleating agent. For example, the nucleating agent of inorganic filler type can be used in an amount of 20 parts by weight or more per 100 parts by weight of the vinyl chloride-based resin. In particular, much larger amounts, say, 40 to 50 parts by weight of an inorganic filler may be used per 100 parts by weight of the resin when certain specific properties, e.g. flame retardancy, are desired in the resultant foamed cellular product although no additional effect is obtained as a nucleating agent by the use of such an inorganic filler in excess of 20 parts by weight.

On the other hand, the amount of a nucleating agent of the type of decomposable foaming agent should be limited not to exceed 5 parts by weight per 100 parts by weight of the resin since larger amounts of the nucleating agent of such a type lead to an excessive volumes of the gaseous decomposition products therefrom resulting in coarse and rugged cellular structure of the foamed body products.

The foam conditioning resin as the third component in the resin composition used in the inventive method is essential for accelerating gelation of the vinyl chloride-based resin and increasing or adjusting the melt viscosity of the resin to an optimum level. By the addition of this foam conditioning resin, coalescence of the foam cells or contraction of the once formed cellular structure can be effectively prevented by increasing the cohesive tenacity of the resin melt so as that the gases produced from the foaming agent are readily retained in the molten resin and prevented from dissipation out of the resin to give a good foamed body with high expansion. This foam conditioning resin exhibits remarkable synergistic effects when used in combination with the above mentioned nucleating agent to give a foamed body of high expansion having a fine and uniform cellular structure with excellent appearance.

Suitable foam conditioning resin is selected from the group consisting of acrylic resins and styrene-based resins as described below in detail. In any way, the foam conditioning resin should be capable of accelerating uniform gelation of the vinyl chloride-based resin, adequately increasing the melt viscosity of the resin, imparting rubbery elasticity to the resin composition and improving the cohesive tenacity of the vinyl chloride-based resin molten at an elevated temperature. These requirements are satisfied by using an acrylic resin or a styrene-based resin having a reduced viscosity of at least 3.0 dl/g or, preferably, at least 5.0 dl/g as measured at 25° C. in a chloroform solution of 0.1 g/100 ml concentration with a sufficiently large degree of polymerization and having good compatibility with the vinyl chloride-based resin.

The acrylic resin suitable as the foam conditioning resin is a polymethyl methacrylate or a copolymer of which the main component, say, at least 40% by weight, is methyl methacrylate copolymerised with one or more of comonomers copolymerizable therewith. The comonomers are exemplified by styrene, acrylonitrile, vinyl esters such as vinyl acetate, acrylic acid and esters thereof such as methyl acrylate, ethyl acrylate, n-butyl acrylate, isobutyl arcylate, 2-ethylhexyl acrylate and the like and methacrylic acid and esters thereof other than methyl methacrylate such as ethyl methacrylate, n-butyl methacrylate, 2-ethylhexyl methacrylate and the like.

The acrylic resin as the foam conditioning resin may be any one of commercially available resins but it is recommendable to use a resin prepared by emulsion polymerization. When the resin composition supplied to an extruder machine contains an emulsion-polymerized resin, smoothness of feeding is improved and blockage of the feeder inlet does not take place so that stable feeding of the resin composition is ensured and the pressure, torque and rate of extrusion of the extruder machine can be constant to give foamed product with uniform quality.

The styrene-based resin used as the other class of the foam conditioning resin may be a polystyrene but is desirably a copolymer of which the main component, say, from 60 to 95% by weight, is styrene copolymerized with acrylonitrile and/or a monomer copolymerizable with these monomers. Copolymers of styrene and acrylonitrile are particularly preferred.

The above mentioned monomer copolymerizable with styrene or acrylonitrile is exemplified by esters of acrylic acid such as methyl acrylate, ethyl acrylate, n-butyl acrylate, isobutyl acrylate, 2-ethylhexyl acrylate and the like, esters of methacrylic acid such as methyl methacrylate, ethyl methacrylate, n-butyl methacrylate, 2-ethylhexyl metahcrylate and the like, maleic acid and fumaric acid and esters thereof and maleic anhydride.

The styrene-based resin used as the foam conditioning resin may be one of commercially available resins but it is recommendable to use a styrene-based resin prepared by emulsion polymerization in view of relatively high degree of polymerization of the resin and good dispersibility thereof in the vinyl chloride-based resin.

It should be noted that better results are obtained by formulating the vinyl chloride-based resin having a higher degree of polymerization with an acrylic resin or styrene-based resin having a correspondingly high degree of polymerization.

The amount of the foam conditioning resin in the resin composition used in the inventive method is in the range from 0.5 to 30 parts by weight or, preferably, from 3 to 20 parts by weight per 100 parts by weight of the vinyl chloride-based resin as the principal component of the resin composition. This is because an amount of the foam conditioning resin smaller than the above given range naturally cannot give the above described desired effects while no particular additional improvements can be obtained by the use of the resin in an amount in excess of the above given range with, instead, certain adverse effects such as the decrease of the flame retardancy inherently possessed by the vinyl chloride-based polymers.

In the resin composition used in the method of the present invention, it is advisable that the resin composition is admixed with a decomposition aid when the nucleating agent is a compound belonging to the class of decomposable foaming agents in order to adjust the decomposition temperature of the foaming agent so as that the gaseous decomposition products are formed at a temperature lower than the temperature of fabrication of the vinyl chloride-based resin. Suitable decomposition aid is exemplified by oxalic acid, citric acid, tartaric acid, urea, and a metal soap such as zinc or copper soap.

It is optional that the resin composition used in the inventive method is admixed with conventional additive ingredients, according to need, such as stabilizers, lubricants, plasticizers, modifiers, flame retardants, foam conditioning agents other than the above described foam conditioning resins, ultraviolet absorbers, anti-oxidants, antistatic agents, pigments and dyes.

The first step of the inventive method is to blend the above described components, i.e. the vinyl chloride-based resin, nucleating agent, foam conditioning resin and other optional ingredients into a uniform resin composition. The thus obtained resin composition is then subjected to heating under pressure to be converted into an at least partly gelled mass. This step is conveniently undertaken in an extruder machine to which the resin composition is supplied continuously. The temperature at which gelation of the resin composition takes place is preferably in the range from 60° to 250° C. although the optimum temperature is dependent on the resin composition and the volatilizable foaming agent pressurized in the following step. In any way, the resin composition cannot be gelled at a temperature lower than 60° C. even with a most powerful shearing force which the resin composition undergoes while a temperature higher than 250° C. is undesirable due to the thermal decomposition of the resin. The pressure of the resin composition in this step is not particularly limitative but it is preferably superatmospheric. These conditions of temperature and pressure are readily satisfied in an extruder machine conventionally used for the fabrication of various kinds of thermoplastic resins.

When the resin composition has been converted into an at least partly gelled mass under the above described conditions of temperature and pressure, desirably, with a shearing force, for example, in an extruder machine, a volatilizable foaming agent as specified below is pressurized into the thus at least partly gelled resin composition under pressure to be absorbed and impregnated therein. It should be noted in this case that the resin composition has been gelled not completely but on the way of proceeding gelation leaving considerable amounts of ungelled resin particles in order to ensure rapid and smooth absorption of the volatilizable foaming agent into the resin mass.

The volatilizable foaming agent used here is preferably an aliphatic hydrocarbon or an aliphatic halogenated hydrocarbon compound having a boiling point of 90° C. or below under atmospheric pressure. Examples of suitable aliphatic hydrocarbon compounds are propane, butane, isobutane, pentane, neopentane, n-hexane, iso-hexane, n-heptane and the like and examples of suitable aliphatic halogenated hydrocarbon compounds are methyl chloride, methylene chloride, chloroform, carbon tetrachloride, ethyl chloride, ethylidene chloride, trichloroethylene, 1,2-dichloroethane, trichlorofluoromethane, dichlorodifluoromethane, bromotrifluoromethane, tetrafluoromethane, dichlorofluoromethane, chlorotrifluoromethane, bromotrifluoroethane, trifluoromethane, trichlorotrifluoroethane, dichlorotetrafluoroethane, dibromotetrafluoroethane, chloropentafluoroethane, hexafluoroethane, chlorodifluoroethane, difluoroethane and the like. These volatilizable foaming agents can be used as a combination of two kinds or more according to need.

The boiling point of the volatiliable foaming agent is not exceeding 90° C. or, preferably, not exceeding 70° C. since the use of a volatilizable foaming agent having a boiling point higher than 90° C. leads to remarkable shrinkage or contraction of the foamed body as well as to lesser uniformity of the cellular structure of the foamed body.

The amount of the volatilizable foaming agent to be pressurized and absorbed into the resin composition in the at least partly gelled condition under pressure is in the range from 1 to 30 parts by weight per 100 parts by weight of the vinyl chloride-based resin although the amount should be determined taking into account the desired ratio of expansion of the finally obtained products of the foamed body.

As is mentioned before, the most convenient way for practicing the method of the present invention is to use an extruder machine into which the resin composition is continuously supplied and converted into a gelled mass by heating under pressure in the extruder machine and the volatilizable foaming agent described above is pressurized into the cylinder of the extruder machine at the halfway thereof where the resin composition is in a partly gelled condition under heat and pressure.

As is mentioned above, the pressurization of the volatilizable foaming agent should desirably be carried out at the stage where the resin composition is in the partly gelled condition in order to ensure rapid and smooth absorption of the foaming agent into the resin mass. It is essential, however, that the resin composition having been impregnated with the volatilizable foaming agent is brought into complete gelation to give a uniformly gelled mass by further heating and kneading before it is brought under a reduced pressure to effect expansion into a cellular foamed body having a uniform and fine cellular structure.

The optimum conditions for the extrusion foaming by use of an extruder machine are determined depending on the resin composition and the volatilizable foaming agent as well as the desired ratio of expansion of the finished foamed products. Generally speaking, the resin composition is heated and kneaded in the cylinder of the extruder machine under pressure at a temperature sufficient to effect gelation of the resin composition and the volatilizable foaming agent is pressurized and absorbed into the resin composition under proceeding gelation through an inlet specially provided in the halfway of the cylinder in which the resin composition is moving. The resin composition thus impregnated with the volatilizable foaming agent is further heated and kneaded to effect complete gelation as it moves in the cylinder toward the die exit. Therefore, the control of the temperature distribution along the cylinder of the extruder machine is very important.

Further, it is desirable that the temperature of the resin composition coming out of the die exit is not excessively high by being cooled uniformly to an appropriate temperature in order to ensure desired fineness and uniformity of the cellular structure of the foamed body product. The preferable temperature of the resin composition under extrusion is determined in relation to the flex temperature and the apparent gelation temperature of the resin composition as defined below. Thus, suitable extrusion temperature of the resin composition is at least 30° C. or, more preferably, at least 40° C. higher than the flex temperature but not exceeding the apparent gelation temperature or, more preferably, at least 15° C. lower than the apparent gelation temperature of the resin composition.

The resin composition impregnated with the volatilizable foaming agent, brought into complete gelation and cooled to the above defined suitable extrusion temperature is then extruded out of the die having a desirably shaped opening under pressure into a zone under reduced pressure, preferably, atmospheric pressure where the resin composition is expanded by the gases produced from the foaming agent into a cellular foamed body with simultaneous cooling.

The definitions of the above mentioned flex temperature and apparent gelation temperature are given below.

Flex or softening temperature: the determination was performed with the resin composition but excluding the foaming agents in accordance with JIS K 6745 by use of a Clash-Berg tester for flex temperature and the temperature at which the shear modulus G was equal to $3.17 \times 10^3$ kg/cm$^2$ was taken as the flex temperature.

Apparent gelation temperature: the determination was performed by use of a conventional rheometer and the temperature was defined to be the temperature at which, when 2 g of the resin composition excluding the foaming agents was heated in a cylinder with a rate of temperature elevation of 3° C./minute under a load of 150 kg/cm$^2$ with a plunger, the rate of effluence of the softened or molten resin composition through a nozzle of 1 mm inner diameter and 10 mm length provided on the bottom of the cylinder was equal to 2 mm$^3$/second.

When the temperature of the resin composition under extrusion after impregnation of the volatilizable foaming agent is too high, undesirable phenomena take place such as gas escape from broken foams, contraction of the foamed body before solidification by cooling and coarsening of the cells resulting in a foamed body product having an open cell structure with partly coalescent and less uniform foams. On the other hand, an unduly low temperature of the resin composition under extrusion at the exit of the die results in an increased viscosity of the resin composition and an insufficient pressure of the gases produced from the foaming agent so that a foamed body of high expansion is hardly obtained. Therefore, the temperature of the resin composition under extrusion is very critical and it is desirable that the resin composition impregnated uniformly with the volatilizable foaming agent is cooled down to an appropriate temperature before it is extruded out of the die of the extruder machine to be expanded into a foamed body.

The method of the present invention is so effective that a continuous length foamed product of slab, sheet, rod, tube or the like is readily obtained having fine and very uniform cellular structure by use of a die having a corresponding opening mounted on an extruder machine.

Following are the examples to illustrate the method of the present invention in further detail but not to limit the scope of the invention by any way.

EXAMPLE 1 ((Experiments No. 1 to No. 13)

The extruder machine used in this example had five sections for resin supply, compression, metering, pressure reduction and mixing and the diameter of the screw was 40 mm with a length/diameter ratio of 30. An opening is provided in the cylinder of the pressure reduction section for injecting the volatilizable foaming agent by use of a tandem-type plunger pump.

Resin compositions were prepared by blending with a super mixer each 100 parts by weight of a polyvinyl chloride resin or a copolymeric resin of vinyl chloride and vinyl acetate as indicated in Table 1 below, 2 parts by weight of a tin-containing stabilizing agent, 1 part by weight of calcium stearate as a lubricant and nucleating agents of inorganic filler type and/or decomposable foaming agent type and acrylic resin of the kind and in amounts described below and indicated in Table 1.

Nucleating agents
  Talc: a product by Tsuchiya Kaolin Co., Japan, having an average particle diameter of 1 to 3 μm.
  Hakuenka: calcium carbonate powder, a product by Shiraishi Calcium Co., Japan, having an average particle diameter of 0.02 to 0.03 μm.
  Orben: a colloidal hydrated aluminum silicate produced by Shiraishi Calcium Co., having an average particle diameter of about 0.5 μm.

Celmic 133: an azodicarbonamide compound produced by Sankyo Kasei, Co., Japan, decomposing at 130° to 180° C.
PTS: 4-toluene sulfonylhydrazide decomposing at 110° C.
AIBN: azobisisobutyronitrile decomposing at 100° to 115° C.
SHC: sodium hydrogencarbonate decomposing at 60° to 150° C.

Acrylic resin
E-1: a copolymeric resin composed of 90% by weight of methyl methacrylate and 10% by weight of ethyl acrylate having a reduced viscosity of 10 dl/g as measured in a chloroform solution at 25° C.

Referring to FIG. 1, a screw extruder and corresponding temperature distribution graph are shown. This is the type of extruder used in the present example. The temperature chart shows the temperature distribution in the various stages or sections of the extruder. Each of the stage of the extruder are clearly shown and correspond to the horizontal axis of the diagram are designated as $C_1$ through section D which is the die section.

The operating conditions of the extruder machine were as follows.

| | |
|---|---|
| Temperature in resin supply section | 80 to 120° C. |
| Temperature in compression section | 100 to 170° C. |
| Temperature in measuring or metering section | 150 to 190° C. |
| Temperature in pressure reduction section | 150 to 190° C. |
| Temperature in mixing section | 130 to 150° C. |
| Temperature in extrusion die | 120 to 130° C. |
| Revolution of screw | 20 to 30 r.p.m. |

When the resin composition supplied to the extruder machine reached the pressure reduction section having been gelled partly, a volatilizable foaming agent, which was a 50:50 by weight mixture of butane and trichlorofluoromethane, was injected through the opening in the cylinder by use of a plunger pump in such a rate that the amount of the volatilizable foaming agent in the resin composition was 10% by weight based on the resin composition.

The resin composition thus impregnated with the volatilizable foaming agent was, after cooling to about 110°–160° C., extruded through the die to undergo expansion under atmospheric pressure and cooled. The foamed bodies thus obtained were examined visually for the condition of the cellular structure and the bulk density of them were determined to give the results, set out in Table 1. In the table, the rating of the condition of the cellular structure designated as A, B and C was given according to the following criteria.

A: fine and uniform cellular structure with excellent appearance in which the diameter of the cells is 500 μm or smaller
B: lesser fineness and uniformity of the cellular structure in which the diameter of the cells is 500 to 1000 μm
C: coarse cellular structure with poor uniformity in which the diameter of the cells exceeds 1000 μm.

TABLE 1

| | | Experiment No. | | | | | | |
|---|---|---|---|---|---|---|---|---|
| | | 1 | 2 | 3 | 4 | 5 | 6 | 7 |
| Vinyl chloride resin | Content of vinyl acetate, % by weight | 5 | 5 | 0 | 0 | 6 | 6 | 6 |
| | Average degree of polymerization | 800 | 800 | 710 | 710 | 1030 | 1030 | 1030 |
| Nucleating agent (parts by weight) | Inorganic filler | Talc (1.0) | None | None | Talc (0.03) | Talc (0.5) | Orben (5) | Hakuenka (20) |
| | Decomposable foaming agent | None | Celmic 133 (1.0) | PTS (0.5) | SHC (5) | SHC (2) | SHC (0.5) | AIBN (0.5) |
| Foam conditioning resin E-1, parts by weight | | 8 | 8 | 10 | 10 | 10 | 10 | 10 |
| Bulk density of foamed body g/cm³ | | 0.057 | 0.050 | 0.060 | 0.061 | 0.058 | 0.056 | 0.060 |
| Cell structure | | A | A | A | A | A | A | A |

| | | Experiment No. | | | | | |
|---|---|---|---|---|---|---|---|
| | | 8 | 9 | 10 | 11 | 12 | 13 |
| Vinyl chloride resin | Content of vinyl acetate, % by weight | 0 | 0 | 0 | 6 | 6 | 6 |
| | Average degree of polymerization | 710 | 710 | 710 | 1030 | 1030 | 1030 |
| Nucleating agent (parts by weight) | Inorganic filler | Talc (1.0) | None | None | Talc (1.0) | Talc (25) | Talc (0.005) |
| | Decomposable foaming agent | None | Celmic 133 (1.0) | None | Celmic 133 (7) | None | None |
| Foam conditioning resin E-1, parts by weight | | 0 | 0 | 10 | 0 | 0.3 | 3 |
| Bulk density of foamed body g/cm³ | | 0.45 | 0.40 | 0.38 | 0.41 | 0.38 | 0.19 |
| Cell structure | | C | C | C | C | B | C |

EXAMPLE 2 (Experiments No. 14 to No. 23)

Resin compositions were prepared each by uniformly blending in a super mixer 100 parts by weight of a copolymeric resin of vinyl chloride and vinyl acetate having an average degree of polymerization of 830 in which the content of vinyl acetate was 5% by weight, 2 parts by weight of a tin-containing stabilizing agent, 1 part by weight of calcium stearate and nucleating agents, i.e. talc and/or Celmic 133, and an acrylic resin in amounts as indicated in Table 2 below. The extruder machine and the conditions for extrusion expansion were the same as in Example 1, in which the kind and the amount of the volatilizable foaming agent impregnated in the resin composition were as shown in Table 2. The acrylic resin denoted as E-1 was the same one as used in Example 1 and the acrylic resin denoted as K125 in Table 2 was a polymethyl methacrylate-based resin having a reduced viscosity of 4.5 dl/g as measured in a chloroform solution at 25° C., which was a product by Rohm & Haas Co. and available by the tradename of Paraloid K125. The abridgments for the volatilizable foaming agents appearing in Table 2 have the meaning as follows.

TCFM: trichlorofluoromethane boiling at 23.7° C.
TCFE: tetrachlorodifluoroethane boiling at 92.8° C.
ISO: isooctane boiling at 99° C.
DCFE: dichlorotetrafluoroethane boiling at 3.6° C.

The bulk densities of the thus obtained foamed bodies are shown in Table 2. In particular, the foamed bodies obtained in Experiments No. 21 to No. 23 exhibited remarkable contraction immediately after extrusion out of the extruder machine probably due to the improper formulation of the resin compositions.

weight of a tin-containing stabilizing agent, 1 part by weight of calcium stearate, 1 part by weight of talc as a nucleating agent, 0.5 part by weight of Celmic 133 (see Example 1) as a decomposable foaming agent and either one of the acrylic resins E-2 to E-7 as described below in an amount indicated in Table 3.

E-2: a copolymeric resin composed of 80% by weight of methyl methacrylate and 20% by weight of ethyl acrylate having a reduced viscosity of 2.0 dl/g as measured in a chloroform solution at 25° C.

E-3: a copolymeric resin composed of 90% by weight of methyl methacrylate and 10% by weight of ethyl acrylate having a reduced viscosity of 3.0 dl/g as measured in a chloroform solution at 25° C.

E-4: a copolymeric resin composed of 90% by weight of methyl methacrylate and 10% by weight of ethyl acrylate having a reduced viscosity of 7.0

TABLE 2

| | Experiment No. | | | | | | | | | |
|---|---|---|---|---|---|---|---|---|---|---|
| | 14 | 15 | 16 | 17 | 18 | 19 | 20 | 21 | 22 | 23 |
| Talc taken, parts by weight | 1.0 | 1.0 | 2.0 | 2.0 | 2.0 | 2.0 | 2.0 | 1.0 | 1.0 | 1.0 |
| Celmic 133, parts by weight | 0 | 0 | 1.5 | 0.5 | 0.5 | 0.5 | 0.5 | 0 | 0 | 0.5 |
| Acrylic resin (parts by weight) | E-1 (8) | E-1 (8) | K 125 (8) | K 125 (8) | K 125 (8) | E-1 (8) | E-1 (8) | None | K 125 (8) | None |
| Volatilizable foaming agent (parts by weight) | $C_3H_8$ (7.0) | $C_4H_{10}$ (7.0) | $C_5H_{12}$ (9.0) | $CH_3Cl$ (10.0) | TCFM (15.0) | TCFM (10) $C_4H_{10}$ (5) | DCFE (15.0) | TCFE (10) | ISO (10) | ISO (20) |
| Bulk density of foamed body, g/cm$^3$ | 0.068 | 0.070 | 0.094 | 0.069 | 0.059 | 0.054 | 0.061 | 0.81 | 0.78 | 0.75 |

EXAMPLE 3 (Experiments No. 24 to No. 35)

In these experiments, two extruder machines were used as combined in tandem. The first extruder machine had a diameter of 50 mm with the length/diameter ratio of 30 and the cylinder was provided with an opening for injecting the volatilizable foaming agent at a position 75 cm apart from the hopper, through which the volatilizable foaming agent could be pressurized into the cylinder by use of a tandem plunger pump. A second extruder machine having a diameter of 65 mm with a length/diameter ratio of 30 was connected to the extruding nozzle of the first extruder machine and the second extruder machine was provided with a die with a 8×400 mm opening for shaping a slab.

Figure 2:
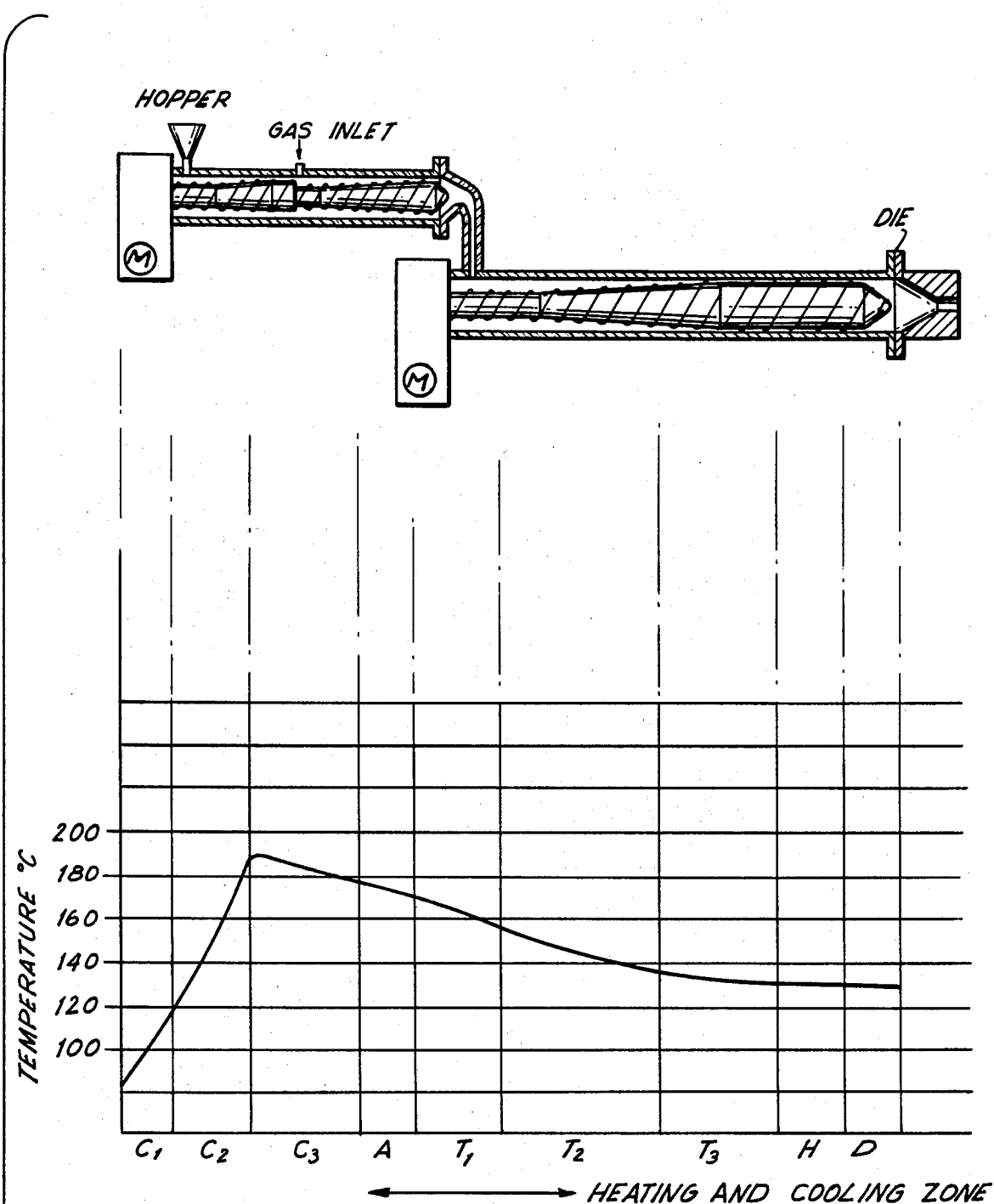
FIG. 2 is a cross-sectional diagram of a double screw extruder for use in the present process and a corresponding temperature distribution graph for the double screw.

FIG. 2 shows the two-stage extruder as utilized in this experiment with a corresponding temperature distribution diagram. Here again, similar to FIG. 1, each of the sections of the tandem screw extruders are shown along with their temperature ranges. Also, the particular action taking place in the specific section is indicated.

The temperature distribution of the cylinder of the first extruder machine was, from the position close to the hopper to the position remote from the hopper: $C_1 = 90°$ C., $C_2 = 130°$ C. and $C_3 = 180°$ C. The temperature distribution of the cylinder $T_1$, $T_2$ and $T_3$, from the position close to the hopper to the position remote from the hopper in the second-stage extruder machine, and the temperature of the extrusion die $D_1$ were as shown in Table 3.

Resin compositions were prepared each by blending in a super mixer 100 parts by weight of a copolymeric resin of vinyl chloride and vinyl acetate having an average degree of polymerization of 760, in which the content of vinyl acetate was 5.8% by weight, 2 parts by dl/g as measured in a chloroform solution at 25° C.

E-5: a copolymeric resin composed of 95% by weight of methyl methacrylate and 5% by weight of ethyl acrylate having a reduced viscosity of 15.3 dl/g as measured in a chloroform solution at 25° C.

E-6: a copolymeric resin composed of 95% by weight of methyl methacrylate and 5% by weight of butyl acrylate having a reduced viscosity of 10.7 dl/g as measured in a chloroform solution at 25° C.

E-7: a copolymeric resin composed of 85% by weight of methyl methacrylate, 5% by weight of butyl acrylate and 10% by weight of butyl methacrylate having a reduced viscosity of 11.0 dl/g as measured in a chloroform solution at 25° C.

The thus prepared resin composition was continuously supplied to the extruder machine and a volatilizable foaming agent which was a 50:50 by weight mixture of butane and trichlorofluoromethane was pressurized into the cylinder through the opening by use of a plunger pump at a rate such that the amount of the impregnated volatilizable foaming agent in the resin composition was 10% by weight.

The cellular foamed bodies obtained in the above described manner by extrusion expansion were examined for the bulk density in g/cm$^3$, condition of cellular structure according to the same criteria as in Example 1, compression strength in kg/cm$^2$ as measured according to the testing procedure specified in ASTM D1621 and flexural strength in kg/cm$^2$ as measured according to the testing procedure specified in ISO-R-1209 to give the results set out in Table 3 below. The table also gives the values of the flex temperature $T_f$ in °C. and the apparent gelation temperature $TQ = 2$ in °C.

The foamed bodies prepared in Experiments No. 32 to No. 34 exhibited remarkable contraction immediately after extrusion due to collapsing of the foams to a great extent. The extrusion in Experiment No. 35 was carried out with remarkably large torque and pressure in the extruder machine in comparison with the other experiments.

As is understood from the results shown in Table 3, the amount of the foam conditioning resin could be decreased when the resin was a high molecular weight acrylic resin having a large reduced viscosity along with the other advantages of improved gas retention, stabilization of the foam cells and decreased contraction of the extruded foams while an acrylic resin with a smaller molecular weight or insufficient amount of addition of the acrylic resin resulted in remarkable collapse of the foams, large contraction of the extruded foams and coarsening of the cellular structure.

Similarly, an excessively high temperature of the resin composition coming out of the die was undesirable due to the insufficient stabilization of the cellular structure and increased contraction of the extruded foams due to remarkable collapse of the foams while a temperature of the resin composition lower than the above defined lower limit results in insufficient degree of expansion along with a remarkably increased torque of the extruder machine and an excessively high pressure for extrusion bringing about difficulties in the operation of the extruder machine.

EXAMPLE 4

The extruder machine used in the extrusion expansion and the operating conditions of the machine were the same as in Example 1.

Resin compositions were prepared each by blending 100 parts by weight of a polyvinyl chloride resin or a copolymeric resin of vinyl chloride and vinyl acetate as indicated in Table 4 below with a similar kind of a nucleating agent or a combination of nucleating agents to those in Example 1 in amounts indicated in Table 4 and a styrene-based resin S-1 which was a copolymer composed of 70% by weight of styrene and 30% by weight of acrylonitrile and having a reduced viscosity of 12 dl/g as measured in a chloroform solution at 25° C. in an amount shown in Table 4.

The volatilizable foaming agent injected into the cylinder of the extruder machine was the same mixture as in Example 1 and the amount of impregnation was also 10% by weight based on the resin composition.

The flex temperature $T_f$ and the apparent gelation temperature $TQ=2$ of the resin compositions, the temperature of the extrusion die $D_1$ and the bulk density and the condition of cellular structure of the foamed body products are set out in Table 4. In Experiments No. 45 and No. 46, the foamed bodies exhibited remark-

TABLE 3

| | | Experiment No. | | | | | | | | | | |
|---|---|---|---|---|---|---|---|---|---|---|---|---|
| | | 24 | 25 | 26 | 27 | 28 | 29 | 30 | 31 | 32 | 33 | 34 | 35 |
| Foam-conditioning resin | | E-3 | E-4 | E-5 | E-6 | E-7 | E-7 | E-6 | E-3 | E-3 | E-2 | E-3 | E-3 |
| (parts by weight) | | (10) | (8) | (6) | (3) | (5) | (25) | (8) | (8) | (0.3) | (5) | (5) | (5) |
| Temperature | $T_1$ | 150 | 150 | 150 | 150 | 150 | 150 | 170 | 150 | 150 | 150 | 180 | 130 |
| distribution, | $T_2$ | 130 | 130 | 130 | 130 | 130 | 130 | 150 | 130 | 130 | 130 | 180 | 100 |
| °C. | $T_3$ | 130 | 130 | 130 | 130 | 130 | 130 | 140 | 120 | 130 | 130 | 170 | 90 |
| | $D_1$ | 120 | 120 | 120 | 120 | 120 | 120 | 140 | 110 | 120 | 120 | 160 | 90 |
| Properties of foamed body | Bulk density, g/cm³ | 0.068 | 0.057 | 0.056 | 0.055 | 0.057 | 0.060 | 0.050 | 0.076 | 0.19 | 0.24 | 0.15 | 0.56 |
| | Cell structure | A | A | A | A | A | A | A | A | C | C | C | A |
| | Compression strength, kg/cm² | 5.0 | 3.7 | 3.7 | 3.3 | 3.8 | 4.8 | 3.3 | 5.4 | 14.0 | 23.0 | 10.0 | — |
| | Flexural strength, kg/cm² | 11.1 | 8.3 | 8.0 | 7.8 | 8.0 | 10.4 | 7.8 | 13.6 | 31.4 | 36.5 | 28.4 | — |
| Temperature of resin composition at the die exit, °C. | | Ca. 125–135 | Ca. 125–135 | Ca. 125–135 | Ca. 125–135 | Ca. 125–135 | Ca. 125–135 | 140–150 | 105–115 | 125–135 | 125–135 | 160–170 | 90–95 |
| Flex temperature $T_f$, °C. | | 66 | 66 | 67 | 66 | 66 | 68 | 67 | 66 | 67 | 67 | 66 | 66 |
| Apparent gelation temperature $TQ = 2$, °C. | | 169 | 170 | 174 | 170 | 170 | 174 | 170 | 169 | 168 | 171 | 169 | 169 | able collapse of the foams immediately after extrusion out of the die exit.

TABLE 4

| | | Experiment No. | | | | | |
|---|---|---|---|---|---|---|---|
| | | 36 | 37 | 38 | 39 | 40 | 41 |
| Vinyl chloride resin | Content of vinyl acetate, % by weight | 5.5 | 5.5 | 0 | 0 | 6.0 | 6.0 |
| | Average degree of polymerization | 850 | 850 | 710 | 710 | 1030 | 1030 |
| Nucleating agent (parts by weight) | Inorganic filler | Talc (2.0) | Talc (1.0) | Talc (0.03) | Talc (0.5) | Orben (5) | Hakuenka (20) |
| | Decomposable foaming agent | None | Celmic 133 (1.0) | SHC (4.0) | Celmic 133 (1.5) | AIBN (5) | PTS (0.3) |
| Foam conditioning resin S-1, parts by weight | | 5.0 | 5.0 | 8.0 | 8.0 | 6.0 | 6.0 |
| Bulk density of foamed body, g/cm³ | | 0.054 | 0.050 | 0.058 | 0.057 | 0.055 | 0.060 |
| Cell structure | | A | A | A | A | A | A |
| Temperature at the die exit $D_1$, °C. | | 138 | 138 | 150 | 150 | 156 | 157 |
| Flex temperature $T_f$, °C. | | 67 | 67 | 69 | 69 | 73 | 75 |
| Apparent gelation temperature $TQ = 2$, °C. | | 172 | 172 | 185 | 185 | 195 | 197 |

| | | Experiment No. | | | | | |
|---|---|---|---|---|---|---|---|
| | | 42 | 43 | 44 | 45 | 46 | 47 |
| Vinyl | Content of vinyl | 0 | 0 | 0 | 6.0 | 6.0 | 6.0 |

TABLE 4-continued

| chloride resin | acetate, % by weight | | | | | | |
|---|---|---|---|---|---|---|---|
| | Average degree of polymerization | 710 | 710 | 710 | 1030 | 1030 | 1030 |
| Nucleating agent (parts by weight) | Inorganic filler | Talc (2.0) | None | None | Talc (1.0) | Talc (25) | Talc (0.005) |
| | Decomposable foaming agent | None | Celmic 133 (1.0) | None | Celmic 133 (7.0) | None | None |
| Foam conditioning resin S-1, parts by weight | | 0 | 0 | 5.0 | 0 | 0.3 | 3.0 |
| Bulk density of foamed body, g/cm³ | | 0.45 | 0.40 | 0.39 | 0.41 | 0.39 | 0.18 |
| Cell structure | | C | C | C | C | B | C |
| Temperature at the die exit $D_1$, °C. | | 150 | 150 | 150 | 155 | 157 | 155 |
| Flex temperature $T_f$, °C. | | 68 | 68 | 69 | 72 | 75 | 72 |
| Apparent gelation temperature TQ = 2, °C. | | 184 | 184 | 185 | 194 | 197 | 194 |

EXAMPLE 5

Resin compositions were prepared each by blending 100 parts by weight of the same copolymeric resin of vinyl chloride and vinyl acetate as used in Example 2, 2 parts by weight of a tin-containing stabilizing agent, 1 part by weight of calcium stearate, talc and/or Celmic 133 as the nucleating agent in amounts as indicated in Table 5 below and the styrene-based resin S-1 in an amount indicated in Table 5.

The conditions of expansion with the extruder machine were the same as in Example 2 and the kind of the volatilizable foaming agent were also the same as in Example 2, the abridgements for the volatilizable foaming agents being the same as in Table 2. The amount of impregnation of the volatilizable foaming agent was as indicated in Table 5.

The bulk density of the foamed bodies is shown in the table. In Experiments No. 55 to No. 57, the foamed bodies exhibited remarkable contraction immediately after extrusion out of the die.

ing a reduced viscosity of 2.0 dl/g as measured in a chloroform solution at 25° C.

S-3: a copolymeric resin composed of 70% by weight of styrene and 30% by weight of acrylonitrile having a reduced viscosity of 4.0 dl/g as measured in a chloroform solution at 25° C.

S-4: a copolymeric resin composed of 70% by weight of styrene and 30% by weight of acrylonitrile having a reduced viscosity of 10.0 dl/g as measured in a chloroform solution at 25° C.

S-5: a copolymeric resin composed of 75% by weight of styrene and 25% by weight of acrylonitrile having a reduced viscosity of 14.6 dl/g as measured in a chloroform solution at 25° C.

The volatilizable foaming agent injected into the cylinder of the extruder machine and the amount of impregnation thereof were the same as in Example 3.

The foamed bodies thus obtained in the form of continuous length slab were examined for the bulk density in g/cm³, condition of the cellular structure, compression strength in kg/cm² as determined according to the

TABLE 5

| | Experiment No. | | | | | | | | | |
|---|---|---|---|---|---|---|---|---|---|---|
| | 48 | 49 | 50 | 51 | 52 | 53 | 54 | 55 | 56 | 57 |
| Talc, parts by weight | 1.0 | 1.0 | 2.0 | 2.0 | 2.0 | 2.0 | 2.0 | 1.0 | 1.0 | 1.0 |
| Celmic 133, parts by weight | 0 | 0 | 1.0 | 0.5 | 0.5 | 0.5 | 0.5 | 0 | 0 | 0.5 |
| Styrene-based resin S-1, parts by weight | 8 | 8 | 8 | 8 | 8 | 8 | 8 | 0 | 8 | 0 |
| Volatilizable foaming agent (parts by weight) | $C_3H_8$ (7.0) | $C_4H_{10}$ (7.0) | $C_5H_{12}$ (9.0) | $CH_3Cl$ (10.0) | TCFM (15.0) | TCFM (10) $C_4H_{10}$ (5) | DCFE (15.0) | TCFE (10) | ISO (10) | ISO (10) |
| Bulk density of foamed body, g/cm³ | 0.069 | 0.067 | 0.088 | 0.066 | 0.055 | 0.052 | 0.060 | 0.81 | 0.79 | 0.75 |

EXAMPLE 6

In this example, the setup of the extruder machines combined in tandem and the operating conditions of the extruder machines were the same as in Example 3 with the temperature distribution in the cylinder and the die of the second extruder machine as shown in Table 6 below.

The formulation of the resin compositions was the same as in Example 3 except that the acrylic resins E-2 to E-7 in Example 3 were replaced with either one of the styrene-based resins S-2 to S-5 as specified below in each of the resin compositions. The amounts of the styrene-based resins in the resin compositions are given in Table 6.

S-2: a copolymeric resin composed of 70% by weight of styrene and 30% by weight of acrylonitrile havprocedure specified in ASTM D 1621 and flexural strength in kg/cm² determined according to the procedure specified in ISO-R-1209 to give the results set out in Table 6 below together with the flex temperature $T_f$ and the apparent gelation Temperature TQ=2 of the resin compositions determined as described before.

As is understood from the results shown in Table 6, the amount of the foam conditioning resin could be decreased when the resin was a high molecular weight styrene-based resin having a large reduced viscosity along with the other advantages of improved gas retention, stabilization of the foam cells and decreased condition of the extruded foams while a styrene-based resin having a smaller molecular weight or insufficient amount of addition of the styrene-based resin resulted in remarkable collapse of the foams, large contraction of the extruded foams and coarsening of the cellular structure.

The effect of the temperature of the resin composition at the exit out of the die was about the same as in Example 3 with an acrylic resin as the foam conditioning resin instead of the styrene-based resin.

TABLE 6

|  |  | Experiment No. | | | | | | | | | | |
|---|---|---|---|---|---|---|---|---|---|---|---|
|  |  | 58 | 59 | 60 | 61 | 62 | 63 | 64 | 65 | 66 | 67 | 68 |
| Foam-conditioning resin |  | S-3 | S-4 | S-5 | S-4 | S-3 | S-4 | S-4 | S-3 | S-2 | S-3 | S-3 |
| (parts by weight) |  | (8) | (6) | (3) | (10) | (25) | (6) | (6) | (0.3) | (5) | (5) | (5) |
| Temperature | $T_1$ | 150 | 150 | 150 | 150 | 160 | 170 | 150 | 150 | 150 | 180 | 130 |
| distribution, | $T_2$ | 130 | 130 | 130 | 130 | 140 | 150 | 130 | 130 | 130 | 180 | 100 |
| °C. | $T_3$ | 130 | 130 | 130 | 130 | 140 | 145 | 120 | 130 | 130 | 170 | 90 |
|  | $D_1$ | 120 | 120 | 120 | 120 | 130 | 140 | 110 | 120 | 120 | 165 | 90 |
| Properties of foamed body | Bulk density, g/cm³ | 0.063 | 0.054 | 0.054 | 0.050 | 0.057 | 0.049 | 0.077 | 0.29 | 0.31 | 0.19 | 0.64 |
|  | Cell structure | A | A | A | A | A | A | A | C | C | C | A |
|  | Compression strength, kg/cm² | 4.0 | 3.5 | 3.5 | 3.1 | 3.6 | 2.9 | 5.3 | 28.4 | 34.0 | 14.5 | — |
|  | Flexural strength, kg/cm² | 12.0 | 10.5 | 10.6 | 9.3 | 10.5 | 9.0 | 14.4 | 43.0 | 61.4 | 31.4 | — |
| Temperature of resin composition at the die exit, °C. |  | Ca. 130–135 | Ca. 130–135 | Ca. 130–135 | Ca. 130–135 | Ca. 130–135 | Ca. 143–148 | Ca. 108–115 | Ca. 130–135 | Ca. 130–135 | Ca. 165–170 | Ca. 90–95 |
| Flex temperature $T_f$, °C. |  | 67 | 68 | 70 | 70 | 71 | 69 | 69 | 66 | 67 | 68 | 68 |
| Apparent gelation temperature TQ = 2, °C. |  | 171 | 171 | 174 | 172 | 174 | 171 | 171 | 168 | 170 | 171 | 171 |

What is claimed is:

1. A method for the preparation of a cellular foamed body of a vinyl chloride based resin which comprises
    (a) blending 100 parts by weight of a vinyl chloride based resin with at least 0.01 part by weight of a nucleating agent and from 0.5 to 30 parts by weight of a foam conditioning resin selected from the group consisting of acrylic resins and styrene based resins into a resin composition,
    (b) heating the resin composition at a temperature in the range from 60° to 250° C. under a superatmospheric pressure so that the resin composition is converted into an at least partly gelled mass,
    (c) pressurizing a volatilizable foaming agent which is an organic solvent having a boiling point not exceeding 90° C. and injecting it into the thus at least partly gelled mass of the resin composition under the pressure so that the resin composition is impregnated uniformly with the volatilizable foaming agent,
    (d) adjusting the temperature of the resin composition to a value at least 30° C. higher than the flex or softening temperature of the resin composition but not greater than the apparent gelation temperature of the resin composition, and
    (e) bringing the resin composition thus impregnated with the volatilizable foaming agent and completely gelled under a reduced pressure with simultaneous cooling so that the resin composition is expanded with the gas produced from the foaming agent into a cellular body.

2. The method for the preparation of a cellular foamed body of a vinyl chloride-based resin ad claimed in claim 1 wherein the foam conditioning resin had a reduced viscosity of at least 3.0 dl/g as measured in a chloroform solution of a concentration of 0.1 g/100 ml at 25° C.

3. The method for the preparation of a cellular foamed body of a vinyl chloride-based resin as claimed in claim 1 or 2 wherein the volatilizable foaming agent is a hydrocarbon compound or a halogenated hydrocarbon compound having a boiling point not exceeding 90° C.

4. The method for the preparation of a cellular foamed body of a vinyl chloride-based resin as claimed in claim 1 or 2 wherein the acrylic resin is a polymethyl methacrylate or a copolymeric resin composed of at least 40% by weight of methyl methacrylate and at most 60% by weight of at least one comonomer copolymerizable with methyl methacrylate.

5. A method for the preparation of a cellular foamed body of a vinyl chloride based resin which comprises
    (a) blending 100 parts by weight of a vinyl chloride based resin with at least 0.01 part by weight of a nucleating agent and from 0.5 to 30 parts by weight of a foam conditioning resin selected from the group consisting of acrylic resins and styrene-based resins into a resin composition,
    (b) supplying the resin composition to an extruder machine,
    (c) heating the resin composition in the cylinder of the extruder machine at a temperature in the range from 60° to 250° C. under a superatmospheric pressure so that the resin composition is converted into an at least partly gelled mass,
    (d) injecting a volatilizable foaming agent which is an organic solvent having a boiling point not exceeding 90° C. into the cylinder so that the resin composition is uniformly impregnated with the volatilizable foaming agent, and
    (e) extruding the completely gelled resin composition thus impregnated with the volatilizable foaming agent from the die mounted on the extruder machine into a zone under a reduced pressure with simultaneous cooling so that the resin composition is expanded with the gas produced from the foaming agent into a cellular body,
wherein the temperature of the resin composition directly before step (e) is at least 30° C. higher than the flex or softening temperature of the resin composition but not exceeding the apparent gelation temperature of the resin composition.

6. The method for the preparation of a cellular foamed body of a vinyl chloride-based resin as claimed in claim 1 or 5 wherein the styrene-based resin is a polystyrene or a copolymeric resin composed of at least 60% by weight of styrene and at most 40% by weight of at least one comonomer copolymerizable with styrene.

* * * * *